(12) United States Patent
Dai et al.

(10) Patent No.: US 8,467,485 B2
(45) Date of Patent: *Jun. 18, 2013

(54) SMART ANTENNA SOLUTION FOR MOBILE HANDSET

(75) Inventors: Yanzhong Dai, Shanghai (CN); Luzhou Xu, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 12 days.

This patent is subject to a terminal disclaimer.

(21) Appl. No.: 13/093,574

(22) Filed: Apr. 25, 2011

(65) Prior Publication Data

US 2011/0261910 A1    Oct. 27, 2011

Related U.S. Application Data

(63) Continuation of application No. 10/540,682, filed as application No. PCT/IB03/06210 on Dec. 22, 2003, now Pat. No. 8,102,956.

(30) Foreign Application Priority Data

Dec. 27, 2002  (CN) .................................. 02 160402

(51) Int. Cl.
*H04B 7/10* (2006.01)
(52) U.S. Cl.
USPC ........... 375/347; 375/147; 375/247; 375/260; 375/262; 375/267
(58) Field of Classification Search
USPC .. 375/347, 147, 247, 260, 262, 267; 370/203, 370/204, 205, 208, 209, 210
See application file for complete search history.

(56) References Cited

U.S. PATENT DOCUMENTS

| 6,011,798 | A |   | 1/2000  | McAlpine |
| 6,069,912 | A | * | 5/2000  | Sawahashi et al. ........... 375/142 |
| 6,118,832 | A |   | 9/2000  | Mayrargue et al. |
| 6,177,906 | B1 |  | 1/2001  | Petrus |
| 6,785,520 | B2 |  | 8/2004  | Sugar et al. |
| 7,016,399 | B1 | * | 3/2006  | Vadgama et al. ............. 375/148 |
| 7,116,702 | B2 |  | 10/2006 | Sim |

(Continued)

FOREIGN PATENT DOCUMENTS

| EP | 0 892 504 A1 | 1/1999 |
| JP | 11-239086    | 8/1999 |

(Continued)

OTHER PUBLICATIONS

International Search Report dated Mar. 31, 2004 in connection with PCT Application No. PCT/IB2003/06210.

*Primary Examiner* — Dhaval Patel
(74) *Attorney, Agent, or Firm* — Coats & Bennett, P.L.L.C.

(57) ABSTRACT

A mobile terminal with smart antennas, comprises a plurality of groups of radio frequency signal processing modules (300), for transforming received multi-channel radio frequency signals to multi-channel baseband signals; a smart antenna processing module (306), for smart antenna baseband processing said multi-channel baseband signals output from said plurality of groups of radio frequency signal processing module so as to combine said multi-channel baseband signals into single-channel baseband signals, according to control information received one-off as said smart antenna processing module is enabled; and a baseband processing module (303-305), for providing said control information to said smart antenna processing module according to data from said smart antenna processing module, and baseband processing said single-channel baseband signals outputted from said smart antenna processing module.

13 Claims, 8 Drawing Sheets

U.S. PATENT DOCUMENTS

| | | |
|---|---|---|
| 7,130,365 B2 | 10/2006 | Li |
| 7,430,257 B1 * | 9/2008 | Shattil .......................... 375/347 |
| 2002/0054621 A1 | 5/2002 | Kyeong et al. |
| 2002/0061005 A1 | 5/2002 | Lee et al. |
| 2003/0043892 A1 | 3/2003 | Braun |
| 2006/0233221 A1 | 10/2006 | Xu et al. |

FOREIGN PATENT DOCUMENTS

| | | |
|---|---|---|
| JP | 2002232385 A | 8/2002 |
| WO | WO 01/59945 A1 | 8/2001 |
| WO | WO 02/11311 A2 | 2/2002 |

* cited by examiner

SMART ANTENNA SOLUTION FOR MOBILE HANDSET

CROSS-REFERENCE TO RELATED APPLICATIONS

The present application is a continuation of prior U.S. patent application Ser. No. 10/540,682 filed on Dec. 12, 2005 now U.S. Pat. No. 8,102,956 which claims priority under 35 U.S.C. §365 to International Patent Application No. PCT/IB2003/006210 filed Dec. 22, 2003, entitled "A SMART ANTENNA SOLUTION FOR MOBILE HANDSET", and International Patent Application No. PCT/IB2003/006210 claims priority under 35 U.S.C. §365 and/or 35 U.S.C. §119(a) to Chinese Patent Application No. 02160402.9 filed Dec. 27, 2002, and all of which are incorporated herein by reference into the present disclosure as if fully set forth herein.

FIELD OF THE INVENTION

The present invention relates to a receiving device for mobile terminals and the receiving method thereof; and, more particularly, to a receiving device with smart antennas for mobile terminals and the receiving method thereof.

BACKGROUND OF THE INVENTION

With mobile subscribers increasing every day, it emerges as a requirement for to modern mobile communication systems to maintain high quality while enlarging the communication capacity. Among such attentions, smart antenna arises as a key technology in modern mobile communication fields.

Smart antenna technology, also known as antenna array technology, usually employs two or more single antenna elements to form an antenna array. When smart antenna used, appropriate weight factors are used to adjust the phase and amplitude of the signals received by each antenna element, thereby the desired signals are enhanced and the interference signals are suppressed after the received signals are weighted and summed. The essence of weight is a kind of spatial filtering.

Researches indicate the introduction of smart antennas can effectively increase SNR (Signal to Noise Ratio) of signals and thus greatly improve the communication quality during communication process. However, mobile terminals of current communication systems generally use the processing module for single antenna systems. If smart antenna technology is to be applied in present mobile terminals, both the hardware and the software of the processing module need to be redesigned, which can be very expensive. Therefore, how to make modifications based on present mobile terminals and take full advantage of the hardware and software resources of the processing module of single antenna systems, comes as a key issue for smart antennas to be applied in mobile terminals.

Now an example of a mobile terminal based on TD-SCDMA standard will be given to show the makeup of the single antenna system in current mobile terminals and the challenges smart antenna faced when applied to the said single antenna system.

FIG. 1 is a block diagram for a standard mobile phone with single antenna, comprising antenna 100, RF module 101, ADC/DAC module 102, baseband physical layer processing module 103, baseband control module 104 and baseband higher layer processing module 105, wherein baseband physical layer processing module 103 may be composed of Rake receiver, spreading/de-spreading module, modulating/demodulating module and Viterbi/Turbo coding/decoding module; while baseband higher layer processing module 105 may be composed of source coder/decoder.

In the downlink, radio signals received by antenna 100 are first amplified and down-converted to intermediate frequency (IF) signals or analog baseband signals in RF module 101; then the intermediate frequency signals or analog baseband signals are transformed to digital baseband signals to be inputted to baseband physical layer processing module 103, after being sampled and quantified in ADC/DAC module 102; in baseband physical layer processing module 103, depending on the control signals from baseband control module 104, signals obtained by successive operations such as Rake receiving, de-spreading, demodulating, deinterleaving, JD (joint detection), Viterbi/Turbo decoding and etc, are provided to baseband higher layer processing module 105; in baseband higher layer processing module 105, the data processed by baseband physical layer processing module 103 will be further processed in data link layer, network layer or higher layer, including higher layer signaling processing, system controlling, source coding/decoding and etc.

At present, the above mobile phone technology with single antenna is very mature. Many manufacturers, including Philips, have developed sound chip-set solutions, where the function of the said baseband physical layer processing module 103 is generally realized by baseband MODEM based on ASIC (application specific integrated circuits).

Whereas the introduction of smart antenna technology into present mobile phones will totally change the settings of the whole baseband physical layer processing module, whose hardware and corresponding software, such as Rake receivers, de-spreading functions and etc, can hardly be utilized.

To reuse the standard baseband system design, Innovics Inc, an electronics equipment provider in L. A., Calif., provided a mobile phone device with smart antennas as shown in FIG. 2.

As shown in FIG. 2, SA (smart antenna) module 206 comprises antenna combiner 208 and combining control module 207, wherein combining control module 207 adjusts two groups of weights of antenna combiner 208, according to the feedback signals outputted from Rake receiver & de-spreading module 209 and Viterbi/Turbo decoder module 210, while antenna combiner 208 combines the inputted signals of the two channels by individually multiplying a group of weights, according to the control signal provided by combining control module 207.

In this solution, smart antenna module (SA module 206) and Rake receiver are separated, i.e. space diversity and time diversity are implemented separately, so the software of standard baseband processing system can be reused. However, since combining control module 207 in SA module 206 still needs dynamic feedback signals from Rake receiver & de-spreading module 209 and Viterbi/Turbo decoder module 210 to control and adjust the antenna combiner 208, while the interface between combining control module 207 and Rake receiver & de-spreading module 209 or Viterbi/Turbo decoder module 210 is not compatible with standard baseband physical layer processing module, therefore, the hardware of standard solutions, such as baseband physical layer processing module 103 and etc, can't be reused.

Hence, if the above solution of Innovics Inc were adopted, the design of standard systems has to be modified, that is the baseband physical layer processing module 103 has to be redesigned to support the said SA Module 206, which can be very difficult.

As described above, with regard to reusing the design of present mobile terminals, only reuse of the software design has been realized in prior art, but reuse of both the software and hardware has not been achieved. Therefore, how to make modifications based on present mobile terminals and effectively take advantage of the hardware and software resources in the processing module of single antenna systems, still remains as a problem to be settled for smart antennas to be applied in mobile terminals.

SUMMARY OF THE INVENTION

One object of the present invention is to provide a receiving device and receiving method for mobile terminals with smart antennas, capable of reusing the software and hardware design of present standard baseband processing modules without making significant modifications.

Another object of the invention is to provide a receiving device and receiving method for mobile terminals with smart antennas in TD-SC DMA systems, in order to effectively settle the conflicts between performing operations of SA modules and reusing functions of baseband processing modules in smart antenna receiving devices.

A still further object of the invention is to provide a receiving device and receiving method for mobile terminals with smart antennas, capable of shortening the synchronization time for inputting data notably, thus bringing great improvements to the performance of communication systems.

To achieve the object above, a mobile terminal with smart antennas as proposed by this invention, comprises:

a plurality of groups of RF (radio frequency) signal processing modules, for to transforming received multi-channel RF signals to multi-channel baseband signals;

a smart antenna processing module, for smart antenna baseband processing the said multi-channel baseband signals outputted from the said plurality of groups of RF signal processing module, so as to combine the said multi-channel baseband signals into single-channel baseband signals, according to the control information received one-off as the smart antenna processing module is enabled;

a baseband processing module, for providing the said control information to the said smart antenna processing module according to data processed by the said smart antenna processing module, and baseband processing single-channel baseband signals outputted from the said smart antenna processing module.

To attain the object above, a method for mobile terminals with smart antennas as proposed in this invention, includes the following steps:

receiving multi-channel RF signals, and transforming the RF signals to multi-channel baseband signals;

generating control information according to one channel baseband signals within the multi-channel baseband signals;

enabling smart antenna baseband processing, and combining the multi-channel baseband signals into single-channel baseband signals according to the control information received one-off;

baseband processing the said single-channel baseband signals.

BRIEF DESCRIPTION OF THE DRAWINGS

Further description of the invention will be given as follows, in conjunction with accompanying figures, in which:

FIG. 2 displays the systematic structure of a current mobile phone with smart antennas built in;

FIG. 5-1 displays the frame structure of signals to be transmitted in TD-SCDMA systems;

FIG. 5-2 presents the structure of DwPTS (downlink pilot time slot) in TD-SCDMA systems;

FIG. 5-3 depicts the structure of UpPTS (uplink pilot time slot) in TD-SCDMA systems;

FIG. 5-4 shows the burst structure of the traffic time slot in TD-SCDMA systems;

DETAILED DESCRIPTION OF THE INVENTION

Detailed description of the present invention will be given below in conjunction with accompanying drawings and specific embodiments.

Figure 3:
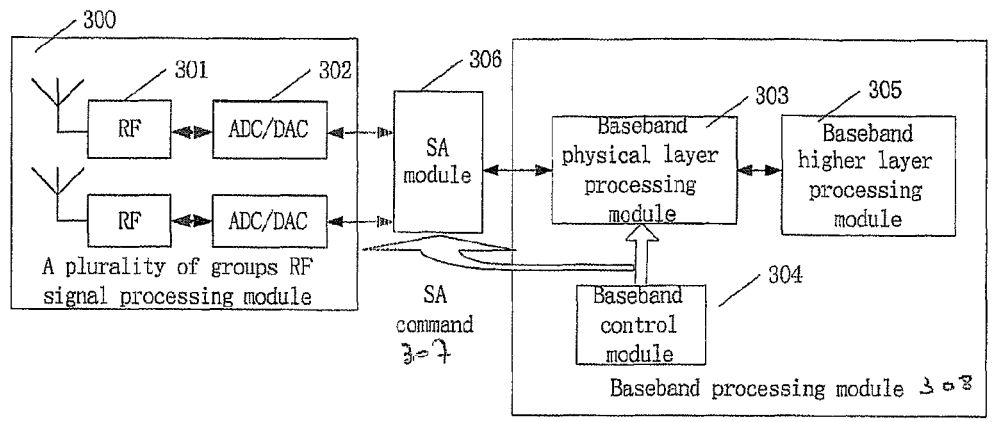
FIG. 3 is the block diagram of the receiving device for mobile terminals with smart antennas according to this invention.

FIG. 3 is the block diagram of the receiving device for mobile terminals with smart antennas proposed by this invention. As shown in the figure, the receiving device includes two groups of RF signal processing modules composed of two antennas 300, two RF modules 301 and two ADC/DAC modules 302, a SA module 306, and a baseband processing module composed of a baseband physical layer processing module 303, a baseband control module 304 and a baseband higher layer processing module 305. More specifically, the two antennas 300 are used for receiving RF signals; RF modules 301 respectively connected with the two antennas are used for amplifying and down-converting the received signals to intermediate frequency signals or analog baseband signals; ADC/DAC modules 302 respectively connected with the output of RF modules 301 are used for sampling and quantifying intermediate frequency signals or analog baseband signals from RF module 301, and transforming them into digital baseband signals when the downlink data are being processed; an SA module 306 connected with the output of each ADC/DAC module 302, is used for smart antenna baseband processing each channel of digital baseband signals; a baseband physical layer processing module 303, is used for baseband processing the digital signals processed by SA module, which may include Rake receiving, de-spreading, demodulating, deinterleaving, JD, Viterbi/Turbo decoding and etc; a baseband higher layer processing module 305 is used for processing the data in fink layer, network layer or higher layer after the data is processed by baseband physical layer processing module 303, which may include higher layer signaling processing, source coding and decoding and etc; a baseband control module 304 connected with baseband physical layer processing module 303, is used for controlling the operations of SA module 306, baseband physical layer processing module 303 and baseband higher layer processing module 305, via a data bus.

As shown in FIG. 3, SA module 306 is independent, capable of performing the smart antenna baseband processing operations, without dynamic feedback signals from baseband physical layer processing module 303, but according to SA control commands transferred via the data bus and provided one-off when SA module is being enabled. The SA control commands transferred to SA module 306 via the data bus or other interfaces, may not only include enabling signals, algorithm selecting signals, DwPTS data, midamble data and etc.

If, in SA module 306, it is needed to reuse the synchronization function of baseband physical layer processing module 303 during the operation of the smart antenna receiving device shown in FIG. 3, in TD-SCDMA systems, synchronization information of baseband physical layer processing module 303 must be obtained when SA module is being initialized.

Detailed description will be given in the following, in conjunction with FIG. 4, to show how SA module first acquires the said synchronization information and then starts normal smart antenna baseband processing in TD-SCDMA systems.

Figure 4:
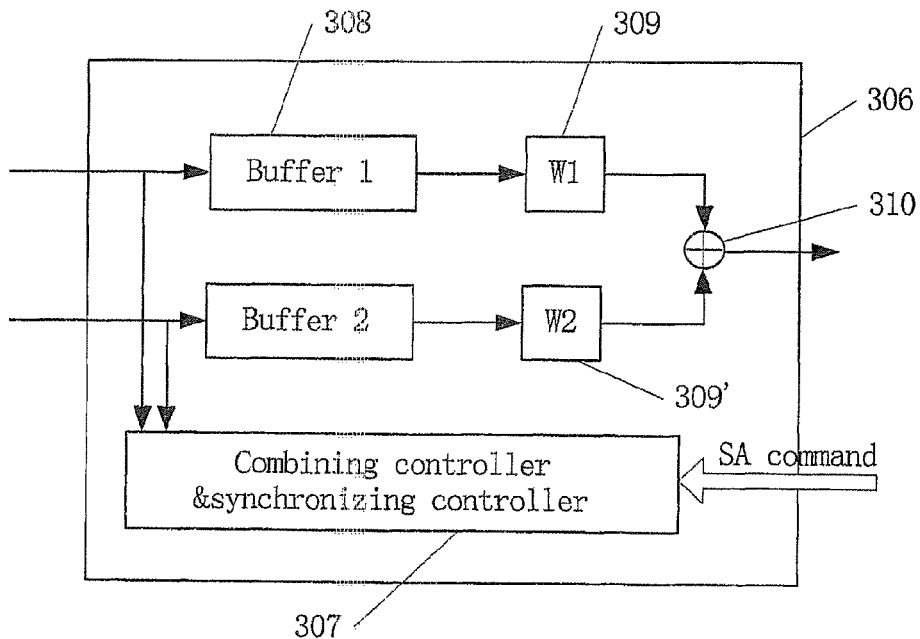
FIG. 4 shows the structure of the SA module in the receiving device of TD-SCDMA mobile terminals with smart antennas according to this invention.

As indicated in FIG. 4, the SA module 306 comprises two buffers 308, for caching digital baseband signals from ADC when the downlink data are being processed, wherein the input ends of the buffers are respectively connected with the output ends of ADC/DAC modules 302; two weight adjusting modules 309 and 309', for weighting the data outputted from the two buffers 308 according to the respectively received weight information; a combiner, e.g. adder 310, for combining the weighted data outputted from the two weight adjusting modules 309 and 309', and outputting the combined data to baseband physical layer processing module 303; a controller, e.g. combining and synchronizing controller 307, for receiving data information inputted from the above ADC/DAC modules 302 to the two buffers 308, synchronizing data stream inputted into the said SA module 306 by a simplified sub-frame and time slot synchronization method, and controlling the weight value of weight adjusting modules 309 and 309' at the same time, according to the SA control commands from the data bus.

The operation procedure is as follows:

Firstly, the smart antenna baseband processing is disabled in SA module 306. At this time SA module can receive signals from single-channel RF signal processing module, i.e. SA module 306 can be regarded as a through path to signals from single-channel RF signal processing module. Then baseband physical layer processing module 303 first obtains DwPTS and user-specific midamble of signals inputted from single-channel RF signal processing module after the connection between the mobile phone and base station is established.

Secondly, the said baseband processing module takes the DwPTS and user-specific midamble from baseband physical layer processing module 303 as part of SA control commands and transfers them to SA module 306 via the data bus, and enables SA module 306 with driving signals in SA control commands.

Thirdly, in data-driven SA module 306, synchronization controller of the combining and synchronization controller 307 matches DwPTS in SA control commands with inputted signals, to realize the synchronization of sub-frames.

Fourthly, after the synchronization of sub-frames is done, synchronization controller of the combining and synchronization controller 307 matches user-specific midamble in SA control commands with inputted signals, to realize the synchronization of time slot in downlink specified by the base station.

Fifthly, after DwPTS is synchronized, the midamble of the received time slot is located. According to the midamble obtained from the received time slot and the user-specific midamble included in SA control commands from the baseband physical layer processing module 303 (as the reference signal), combining controller of the combining and synchronization controller 307 calculates the corresponding weights, and provides the calculated weights to the two weight adjusting modules 309 and 309', by the weight algorithm designated in the SA control commands.

Sixthly, in weight adjusting modules 309 and 309', the data outputted from the two buffers 308 are respectively multiplied by the corresponding weights obtained from step 5, and the weighted data are outputted to adder 310.

Seventhly, the data combined in adder 310 are forwarded to the following baseband physical layer processing module 303.

Eighthly, repeat the above step 3-7, and SA module will process the inputted signals in the pipeline fashion.

In the operation procedures above, several points need to be specially clarified:

1. In the above step 1, SA module is disabled at the first beginning, and it starts to work by data-driving only when receiving SA control commands via the data bus in step 2, wherein the SA commands include synchronization information for synchronizing the inputted signals, such as DwPTS, user-specific midamble, signals for enabling SA module and selecting the weight algorithm. That is to say, the synchronization information is obtained before SA module starts to work, therefore SA module can reuse the synchronization function of baseband physical layer processing module 303, and conflicts won't be caused.

2. In the above step 3 and 4, the SA module adopted a simplified method of sub-frame and time slot synchronization. The reason for being able to use this simplified synchronization method is determined by the frame structure of signals transmitted in TD-SCDMA systems. Detailed description will be given below, in conjunction with FIGS. 5-1, 5-2, 5-3 and 5-4, to depict the frame structure of signals transmitted in TD-SCDMA systems.

Figure 1:
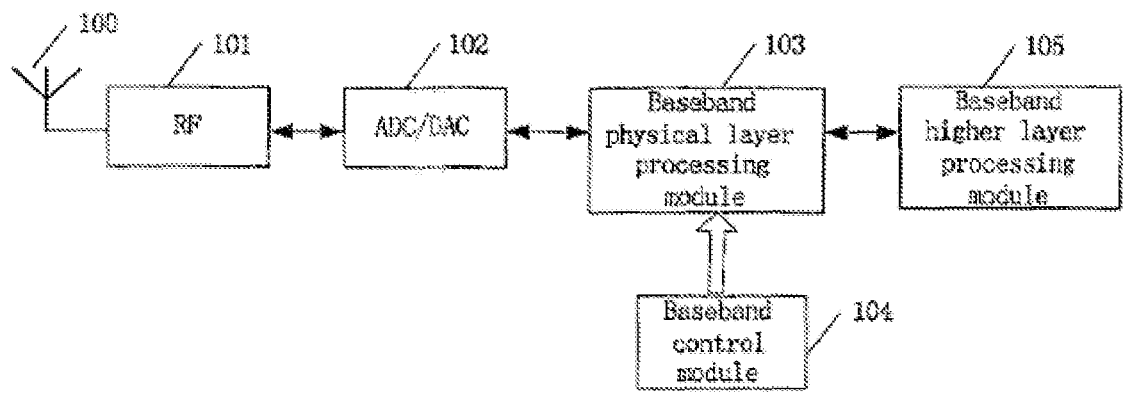
FIG. 1 is a block diagram of a standard mobile phone with single antenna in to TD-SCDMA.
Figure 2:
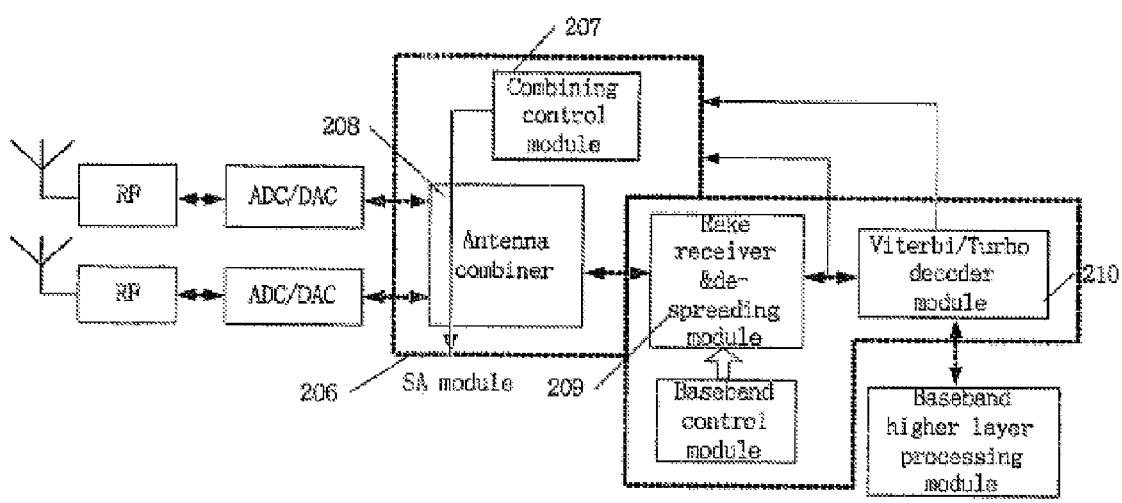
Figures 1, 5:
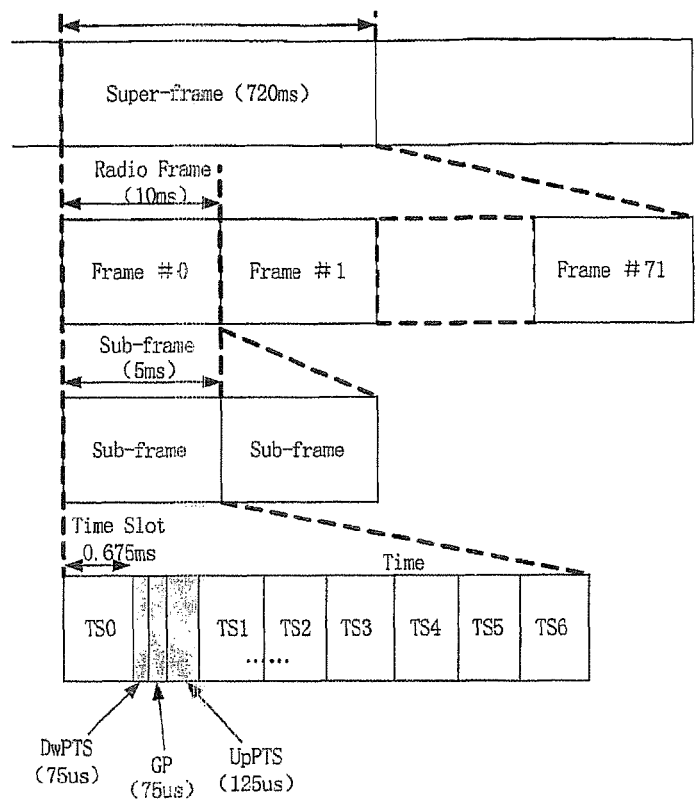
Figures 2, 5:
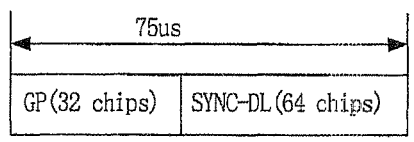
Figures 3, 5:
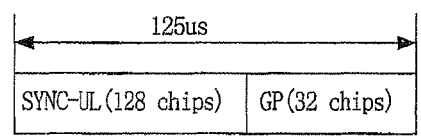
Figures 4, 5:
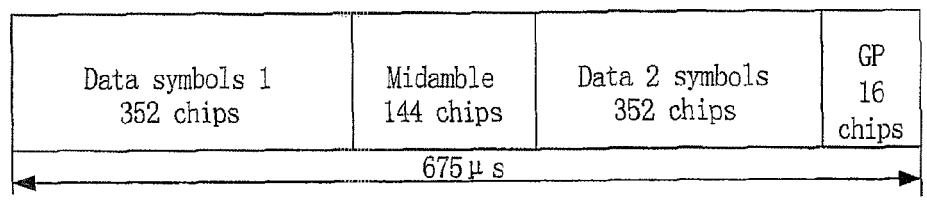

As shown in FIG. 5-1, a frame in TD-SCDMA system consists of 4 layers from the top down. They are super-frame, radio frame, sub-frame and time slot, wherein the length of a super-frame is 720 ms and every super-frame consists of 72 radio frames with length of 10 ms each; the radio frame is divided into 2 sub-frames with length of 5 ms each and the frame structure of each sub-frame is the same. The structure of the 5 ms-long sub-frame facilitates fast power control, uplink synchronization and beam forming. It can be also seen in FIG. 5-1 that every sub-frame consists of 7 traffic timeslots and 3 special timeslots. TS0 to TS6 in FIG. 5-1 are traffic time slots, and DwPTS, UpPTS and GP (guard period) are three special time slots. In FIG. 5-2 and 5-3, further description is given to the structures of DwPTS and UpPTS, wherein the SYNC-DL field in FIG. 5-2 and the SYNC-UL field in FIG. 5-3 are respectively used in frame synchronization as downlink or uplink pilot. The burst frame for traffic time slots, such as T0-T6, is also presented in FIG. 5-4, As shown in the figure, the training sequence, i.e. midamble, is located in the middle of traffic time slot and its position is fixed. The length of midamble is 144 chips, and for different cells the midamble codes may be different, i.e. using different midamble sets. In TD-SCDMA, the midamble is also used for smart antenna algorithm.

In the above description in conjunction with FIGS. 5-1 to 5-4, the structure of sub-frames in every radio frame is the same in TD-SCDMA systems, so sub-frame synchronization method can be used to in step 3 to synchronize the inputted RF signals. Since the midamble of inputted signals is used to calculate the receiving weights of smart antennas in TD-SCDMA systems, and the position of the midamble in inputted signals is fixed, time slot synchronization can be utilized in step 4 to further obtain midamble of inputted signals to calculate the weights of smart antennas.

3. In the above step 3 and step 4, the SA module uses the simplified methods of sub-frame synchronization and time slot synchronization. The inputted signals in the simplified methods, DwPTS and user-specific midamble, are obtained by the SA module from baseband physical layer processing module 303. Therefore, the sub-frame and time slot of inputted signals can be synchronized by matching the DwPTS and user-specific midamble obtained from feedback signals with inputted signals, without searching the DwPTS and the user-specific midamble.

The SA module with the structure and the synchronization method according to this invention can save time up to 31/32 in sub-frame synchronization and up to 15/16 in time slot synchronization, compared with the whole synchronization procedure performed in baseband physical layer processing module.

4. As stated above, the midamble used to calculate the weight value of smart antennas in TD-SCDMA systems is in the middle of a time slot as shown in FIG. 5-4, therefore two buffers 308 are used in SA module 306 to receive signals, i.e. received signals have to be cached first and then processed till the midamble of the current time slot has been received.

5. In the process of the above sub-frame synchronization and time slot synchronization, the distance between the two smart antennas for receiving inputted signals is very short, so signals reach the two channels almost at the same time. If the two channels are synchronized at the same time, the above sub-frame synchronization and time slot synchronization can be performed in one channel only.

6. The structure of SA module in FIG. 4 is also applicable in uplink mode.

According to the smart antenna receiving device and receiving method as proposed in this invention, only SA module is to be inserted into current mobile phones with single antenna to realize the integration of smart antenna technology and mobile phones, without making significant modifications to the hardware and software design of present mobile phones. However, the embedment of SA module will inevitably bring some influences to present components such as baseband physical layer processing module 303 and etc, especially time delay brought by buffers 308 in SA module, which should be a problem not to be skipped during the implementation procedure of the invention. In the design procedure of the invention, some predefined parameters are set in baseband physical layer processing module 303 to reflect the time delay brought by the buffers. The time delay mainly results in two problems:

(1) Closed-loop Control, Including Power Control, AGC (Automatic Gain Control), AFC (Automatic Frequency Control), and etc.

Power control is a closed-loop control between a base station and a mobile phone, with the maximum frequency at 200 Hz, i.e. power control is performed every sub-frame at most and the processing time for power control is almost one sub-frame. If the processing time delay caused by the SA module 306 is one time slot, approximately 1/7 sub-frame, power control can hardly be affected.

AGC and AFC are closed-loop control in a mobile phone. The response time for AGC and that for AFC are not specified in TD-SCDMA standard. According to current WCDMA MODEM designs, the response time can be one time slot. In such a case, the processing time delay caused by SA module 306 may deteriorate the performance of mobile phones, and therefore the deterioration may be reduced by further shrinking the size of the two buffers 308.

(2) Uplink Synchronization.

In TD-SCDMA systems, uplink synchronization is required before random access procedure, which requires the signals of different users to be synchronized before being received by the base station, The procedure and specification are defined as follows:

a. First synchronize the downlink;
b. User equipment sends UpPTS and then the base station sends adjust information;
c. Use midamble to maintain uplink synchronization;
d. Synchronous precision is 1/8 chip.

Figure 6:
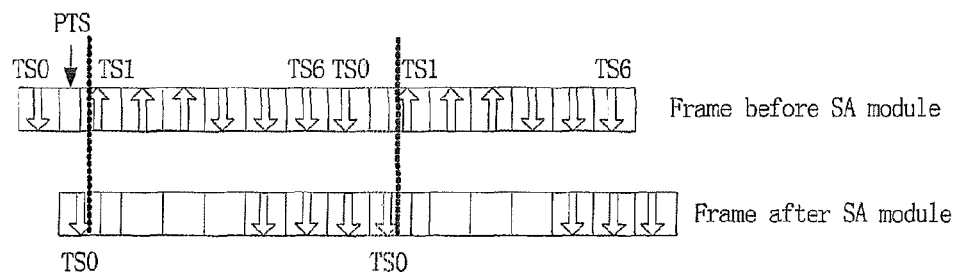
FIG. 6 is the schematic diagram of two successive sub-frames being processed in TD-SC DMA systems.

Due to the processing time delay caused by the SA module and baseband physical layer processing module 303, uplink synchronization should be carefully maintained. Given that the processing delay caused by the SA module 306 is one time slot, the illustration of two successive sub-frames is shown in FIG. 6. After SA module 306 processing, only downlink time slots of the frame are interested, wherein TSi denotes the ith time slot of the sub-frame; PTS denotes both DwPTS and UpPTS; "↑" and "↓" denote uplink and downlink respectively.

It can be seen in FIG. 6 that the data frame after the SA module processing is delayed one time slot. The uplink time slots are shown in the frame before SA. Then the baseband physical layer processing module 303 has to process the data of both downlink and uplink at the same time (as indicated by the dotted lines). For example, when TS0 is being processed by the SA module 306 and forwarded to the baseband physical layer processing module 303, TS1 is also being processed by the baseband physical layer processing module 303. This requires that the baseband physical layer processing module 303 must support parallel processing of both uplink and downlink data. According to the WCDMA modem design, the data of uplink and downlink are parallel processed without conflicts. The design of TD-SCDMA baseband physical layer processing module 303 is similar to WCDMA, so conflicts would not occur either.

Considering the time delay caused by the above buffers, this invention provides an embodiment of the smart antenna receiving device for mobile phones. In this embodiment, the buffers in SA module are realized as two ring-FIFOs, whose structure will be presented in the description in conjunction with FIG. 7 in the following.

Figure 7:
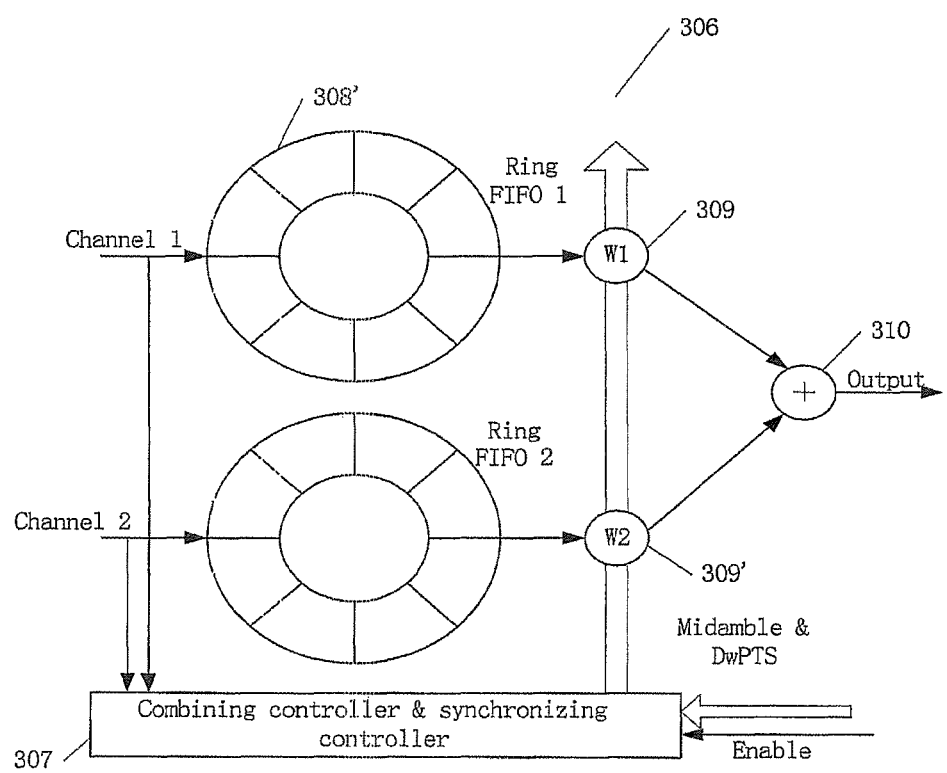
FIG. 7 illustrates the structure of an embodiment of the SA module in FIG. 4.

FIG. 7 depicts the structure of an embodiment of the SA module in FIG. 4. In this embodiment, buffers 308 are two ring-FIFO buffers 308', with each size as one time slot. Other modules released in FIG. 7 are the same as their corresponding modules in FIG. 4, so repeated depiction is not necessary here. It should be noted that the SA module 306 can be implemented in this way, but not limited to the same way.

Figure 8:
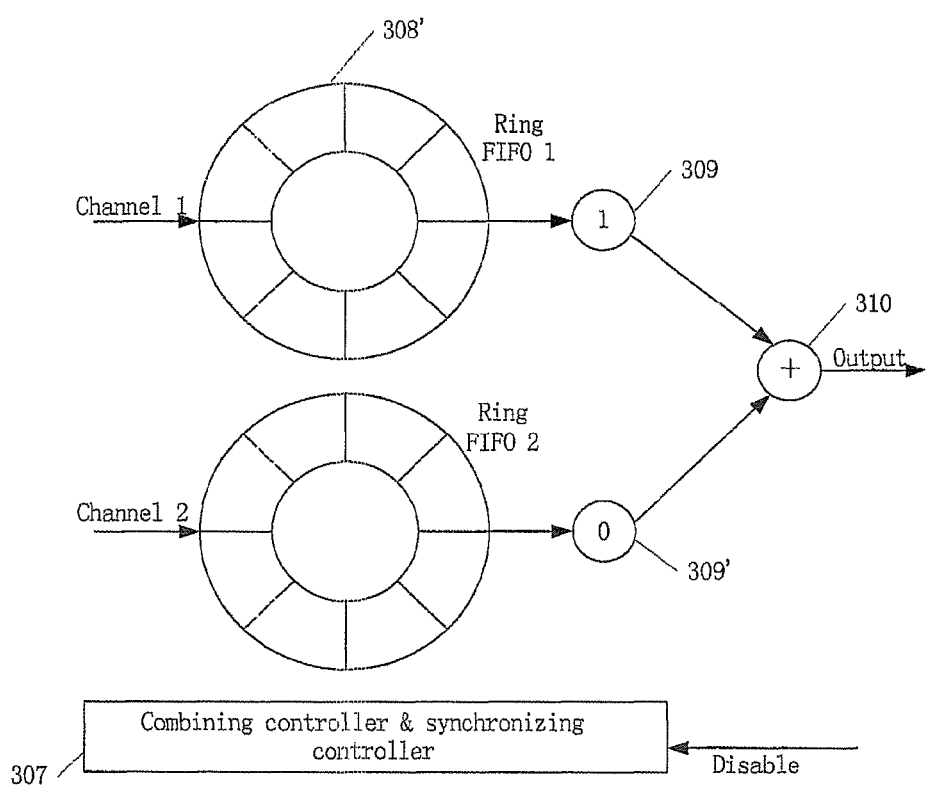
FIG. 8 schematically shows the structure of SA module when the smart reception of the SA module in FIG. 7 is disabled.

Description will be given to the processing steps of SA module in FIG. 7, in conjunction with FIGS. 8, 11 and 12, in the following:

(1) SA Module Disabled

An omni-directional beam is required before a connection is established or when the SA performance is unacceptable. The SA module 306 is disabled by baseband control block. At this time, the signal of channel 1 is passed, and that of channel 2 is suppressed. The received signals are cached in two ring-FIFO buffers 308' first, and then forwarded to the following module when the two ring-FIFO buffers 308' are full. The data stream will be delayed one time slot. The structure is shown in FIG. 8.

(2) SA Module Enabled

Figure 9:
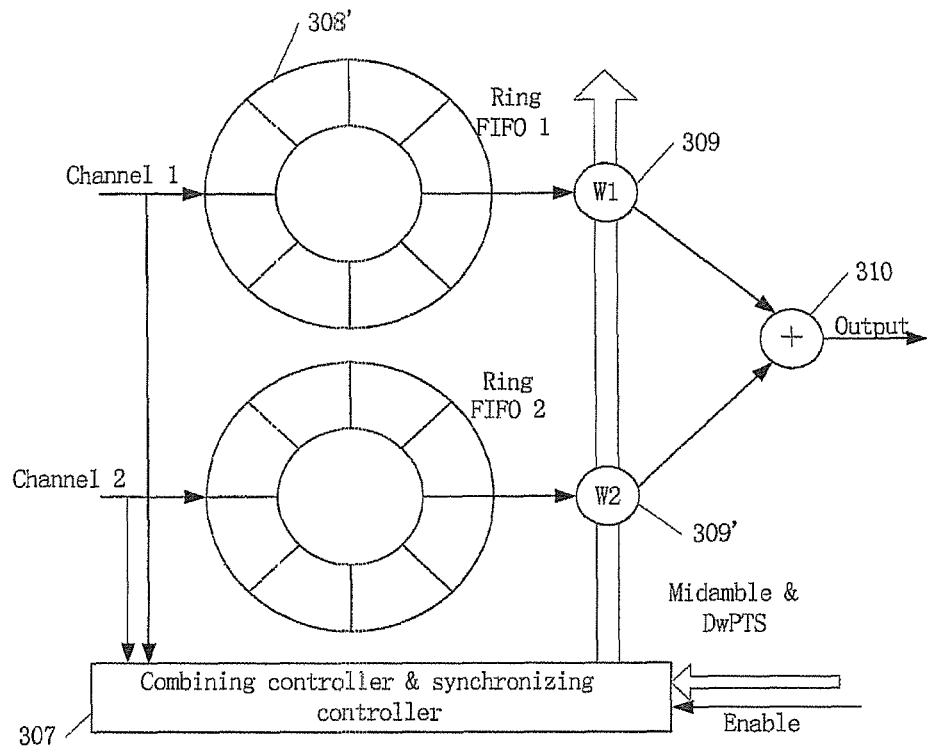
FIG. 9 schematically illustrates the structure of SA module when the smart reception of the SA module in FIG. 7 is enabled.

After the connection is established and the DwPTS and Midamble are obtained from the baseband processing module via the data bus, SA module 306 is enabled by the baseband control module 304. Then, the DwPTS is used to match for sub-frame synchronization. The structure is shown in FIG. 9.

(3) Sub-frame Synchronized

Synchronize the sub-frames by matching DwPTS with the received signals of channel 1, and then the midamble is used to match for DwPTS synchronization.

(4) DwPTS Synchronized

After one DwPTS is synchronized by using the midamble, the two weights (w1, w2) are calculated with the received midamble and the midamble obtained from the baseband physical layer processing module 303 via the data bus.

(5) Combining

When the previous time slot (if there is one) has been processed, all the data of current time slot are cached in the ring-FIFO buffer 308'. The cached data are combined after being multiplied with the corresponding weights respectively and forwarded to the following module.

(6) Repeat Step (3)-(5)

The received data stream can be processed in this pipeline fashion in the SA module.

Figure 10:
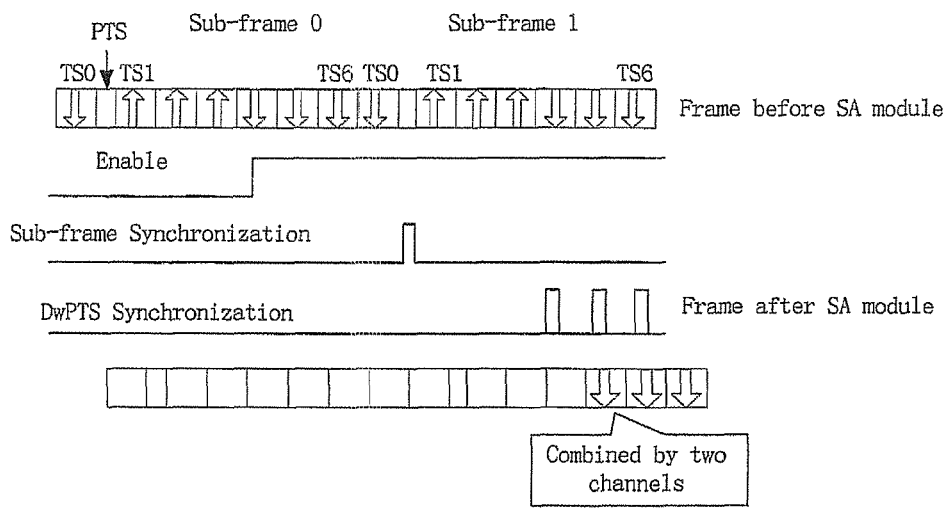
FIG. 10 indicates the time sequence of initializing SA module in TD-SCDMA systems.

The time sequence of SA module 306 when initialized is shown in FIG. 10, wherein sub-frame 0&1 denote the first and the second sub-frame received; "↑" and "↓" denote uplink and downlink respectively; ⇩ denotes that the time slot is being combined by two downlink time slots of each channel.

Beneficial Use of the Invention

From the above description of the invention in conjunction with accompanying figures, it can be clearly seen that the stand-alone SA module embedded in current mobile phones, obtains UpPTS, midamble and other signals for synchronizing data and calculating weight one-off when being enabled, so the stand-alone SA module can reuse the software and hardware design of standard baseband physical layer to processing module without making significant modifications.

Meanwhile, in this invention, SA, module is first disabled, and enabled after the connection is established and SA control commands such as synchronization information etc are transferred to SA module via the data bus, which skillfully avoids conflicts between performing the operations of the SA module and reusing the functions of baseband physical layer processing module.

Furthermore, a simplified method for sub-frame and time slot synchronization is adopted in the SA module of the invention, more particularly synchronization information is directly obtained from SA control commands without searching the DwPTS and midamble, which greatly shortens the time for synchronizing the inputted data, and boosts the performance of communication systems.

Of course, while the invention has been shown and described with respect to the preferred embodiment, it will be understood by those skilled in the art that the smart antenna receiving device and method for mobile phones provided in the present invention may not be only limited to mobile phone systems, but also applicable for other wireless mobile communication terminals, WLAN terminals and etc.

At the same time, it will be understood by those skilled in the art that the smart antenna receiving device and method for mobile phones provided in the present invention may not be only limited to TD-CDMA systems, but also applicable for GSM, GPRS, EDGE, WCDMA, CDMA IS95, CDMA 2000 and other cellular communication systems.

It will be understood by those skilled in the art that various modifications can be made to the smart antenna receiving device and method for mobile phones provided in the present invention, without departing from the fundamentals of the contents of the invention. Therefore, the scope of the invention to be protected needs to be defined by what is claimed.

What is claimed is:

1. A smart antenna module for processing multi-channel signals received by smart antennas to generate single channel signals for input to a baseband processing module, the smart antenna module comprising:

a plurality of buffers, each configured to cache respective inputted multi-channel signals;

a plurality of weight adjusting circuits, each associated with a respective one of the plurality of buffers and configured to weigh data outputted from the respective buffer according to a respectively received weight;

a combiner configured to combine the weighted data outputted from each of the plurality of weight adjusting modules so as to combine the inputted multi-channel signals into single-channel signals; and a controller configured to:

switch the smart antenna module between an initialization mode and a processing mode responsive to a control signal from the baseband processing module;

control the smart antenna module to pass-through the multi-channel signals to the baseband processing module while in the initialization mode;

receive control information from the baseband processing module while in said initialization mode; and compute combining weights for said weight adjustinq modules using said control information while in said processing mode.

2. The smart antenna module of claim 1, wherein the buffers are ring-FIFOs.

3. The smart antenna module of claim 2, wherein a size of each ring-FIFO is one time slot.

4. A mobile terminal with smart antennas, the mobile terminal comprising:

a smart antenna processing module configured to smart antenna baseband process multi-channel baseband signals so as to combine the multi-channel baseband signals into single-channel baseband signals, according to control information received one-off as the smart antenna processing module is enabled; and a baseband processing circuit configured to provide the control information to the smart antenna processing module, and baseband process the single-channel baseband signals outputted from the smart antenna processing module;

wherein the control information at least includes: a signal used to enable the smart antenna processing module, downlink pilot time slot data and a Midamble, and wherein the smart antenna processing module includes:

a plurality of buffers configured to cache received data information; a plurality of weight adjusting circuits, each configured to weigh data outputted from each of the plurality of buffers according to a respectively received weight;

a combiner configured to combine the weighted data outputted from each of the plurality of weight adjusting circuits and outputting combined data; and a controller configured to synchronize data streams inputted into the smart antenna processing module according to the control information, and provide the weight to each of the plurality of weight adjusting circuit.

5. The mobile terminal of claim 4, wherein the buffers are ring-FIFOs.

6. The mobile terminal of claim 5, wherein a size of each ring-FIFO is one time slot.

7. The mobile terminal of claim 4, wherein the controller includes a synchronization controller configured to synchronize sub-frames of the input multi-channel signals by matching the input multi-channel signals with the down-link pilot time slot data of the control information, and synchronize time slots of the input multi-channel signals by matching the input multi-channel signals with the Midamble of the control information; and the controller includes a combining controller configured to calculate the weights provided to the weight adjusting circuit according to one or more Midambles of the input multi-channel signals and the Midamble of the control information.

8. A method for a mobile terminal with smart antennas comprising:

generating control information according to one channel baseband signals within multi-channel baseband signals;

enabling smart antenna baseband processing, and combining the multi-channel baseband signals into single-channel baseband signals according to the control information received one-off; and baseband processing the single-channel baseband signals, wherein enabling smart antenna baseband processing, and combining the multi-channel baseband signals into single-channel baseband signals according to the control information received one-off further includes:

caching the multi-channel baseband signals before enabling the smart antenna baseband processing;

synchronizing the multi-channel baseband signals with synchronization information included in the control information according to the control information, after enabling the smart antenna baseband processing;

calculating weights according to the multi-channel baseband signals and the control information;

respectively weighting the cached data according to the calculated weights; and combining the weighted data to carry out the baseband processing.

9. The method of claim 8, wherein generating control information according to one channel baseband signals within multi-channel baseband signals is completed in a baseband processing module.

10. The method of claim 8, wherein synchronizing the multi-channel baseband signals with synchronization information included in the control information according to the control information, after enabling the smart antenna baseband processing is completed within one channel of a smart antenna processing module.

11. The method of claim 8, wherein the control information at least includes: a signal used to enable the smart antenna baseband processing, down-link pilot time slot data and a Midamble.

12. The method of claim 8, wherein the control information at least includes: a signal used to enable the smart antenna baseband processing, a weight-algorithm selecting signal, down-link pilot time slot data and a Midamble.

13. The device of claim 1 wherein the controller is further configured to synchronize the device with said multi-channels signals using said control information while in said initialization mode.

* * * * *